United States Patent [19]

Gasiot et al.

[11] Patent Number: 4,507,562
[45] Date of Patent: Mar. 26, 1985

[54] METHODS FOR RAPIDLY STIMULATING LUMINESCENT PHOSPHORS AND RECOVERING INFORMATION THEREFROM

[76] Inventors: Jean Gasiot, 27 LeClos, 34960 Clapiers, Herault, France; Peter F. Braunlich, SW. 730 City View, Pullman, Wash. 99163; Jean P. Fillard, 132 Rue du juge, 34980 St. Gely du Fesc, Herault, France

[21] Appl. No.: 470,633

[22] Filed: Feb. 28, 1983

Related U.S. Application Data

[63] Continuation-in-part of Ser. No. 197,914, Oct. 17, 1980, abandoned.

[51] Int. Cl.$^3$ .............................................. G01T 1/105
[52] U.S. Cl. ................................ 250/484.1; 250/473.1
[58] Field of Search ................ 250/337, 327.2, 484.1, 250/473.1

[56] References Cited

U.S. PATENT DOCUMENTS

| | | | |
|---|---|---|---|
| 3,729,630 | 4/1973 | Yamashita | 250/337 |
| 3,975,637 | 8/1976 | Ikedo et al. | 250/337 |
| 4,091,284 | 5/1978 | Yamamoto | 250/337 |
| 4,258,264 | 3/1981 | Kotera et al. | 250/484.1 |
| 4,284,889 | 8/1981 | Kato et al. | 250/337 |
| 4,400,619 | 8/1983 | Kotera et al. | 250/484.1 |
| 4,438,333 | 3/1984 | Teraoka et al. | 250/337 |

Primary Examiner—Alfred E. Smith
Assistant Examiner—Carolyn E. Fields
Attorney, Agent, or Firm—Wells, St. John & Roberts

[57] ABSTRACT

Disclosed is a method for rapidly stimulating luminescent phosphors using laser beams. The laser beam must strike the luminous phosphor with an intensity sufficient to cause rapid release of luminescent energy stored within the phosphor as a result of previous exposure to ionizing radiation. Emission of the luminescent energy can occur within very brief peiods of time, for example, less than 100 nanoseconds. The invention also includes a method for determining the amount of ionizing radiation to which a luminescent phosphor was exposed. Also disclosed is an apparatus for carrying out these methods.

17 Claims, 3 Drawing Figures

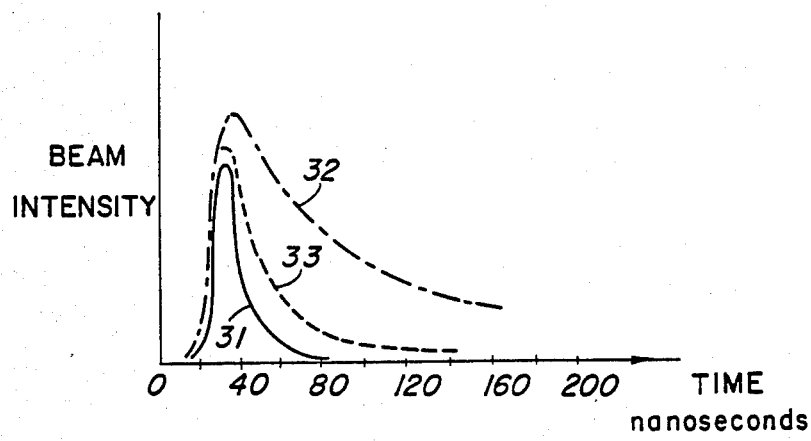
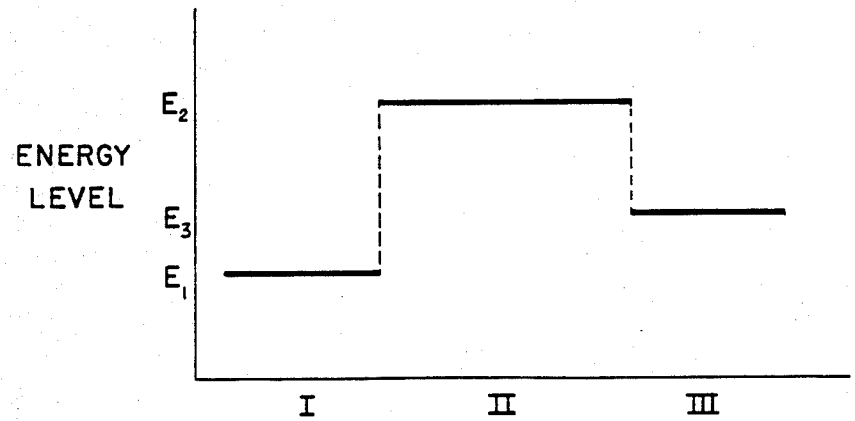

METHODS FOR RAPIDLY STIMULATING LUMINESCENT PHOSPHORS AND RECOVERING INFORMATION THEREFROM

CROSS REFERENCE TO RELATED APPLICATION

This is a continuation-in-part of U.S. application Ser. No. 197,914, filed Oct. 17, 1980, now abandoned.

TECHNICAL FIELD

The technical field of this invention is methods for stimulating luminescent phosphors.

BACKGROUND OF THE INVENTION

It is commonly known that certain luminescent phosphors have the ability to store energy which strikes them in the proper form. In particular, it has been found that some phosphors have the ability to store energy dependent upon the amount of gamma and X radiation which has impinged upon the phosphor. This phenomenon has been put to use in the manufacture of dosimeters which record the amount of high energy radiation to which a worker has been exposed. Such dosimeters are commonly used in and around nuclear facilities.

Before this invention, it has been common to release the luminescent energy stored within the luminescent phosphors by using a heat source. Upon heating, the phosphor emits a beam of light or other electromagnetic radiation which is detected and the intensity and duration of the beam is measured so that the amount of radiation exposure can be determined.

Stimulation of such luminescent phosphors has typically been by heat sources and is commonly called thermoluminescence. Thermoluminescent stimulation occurs using direct heating by contact with a hot object, heating by using an infrared beam produced by incandescence or by using a laser which heats the phosphor and thereby releases the luminescence stored within, as shown in U.S. Pat. No. 3,729,630 to Yamashita et al. Such thermoluminescent stimulation techniques are relatively slow with the fastest response time indicated by Yamashita as being about one half second. Although this may appear to be a fast response time in the technical area of dosimeters, other applications such as real time imaging, require that stimulation occur much more quickly and until this time rapid stimulation occurring in less than one microsecond has not been possible.

Another problem encountered in stimulating luminescent phosphors is the relatively poor signal-to-noise ratio which can be achieved with current stimulation methods and apparatus. When a luminescent phosphor is exposed to a heating element or heating laser, it takes a substantial amount of time in order to heat and bring about the emission from the luminescent material. Since the emission occurs over a relatively long period of time and at a relatively low level of luminous intensity, the background electronic noise is a sizeable component of the total measurement. This poor signal-to-noise ratio makes it difficult to read with precision the amount of luminescent energy which is released from the phosphor.

Prior art phosphor stimulation techniques have also been limited because it is difficult to focus a stimulating infrared beam to a size much smaller than 50 micrometers in diameter without employing very costly and sophisticated optical equipment. This increases the amount of luminescent phosphor which must be used for any application and also increases the amount of energy necessary to stimulate that phosphor. Small size units of phosphor are desirable when good resolution imaging is desired.

The current invention has been developed to solve the problems discussed above and other problems.

BRIEF DESCRIPTION OF THE DRAWINGS

A preferred and alternate embodiment of this invention is illustrated in the accompanying drawings, in which:

FIG. 2 is a graph showing beam intensity as it varies with time during the method disclosed hereinafter; and FIG. 3 is a diagram to aid in understanding the various energy levels which are being assumed by electrons in the luminescent material.

DESCRIPTION OF THE PREFERRED EMBODIMENTS

Figure 1:
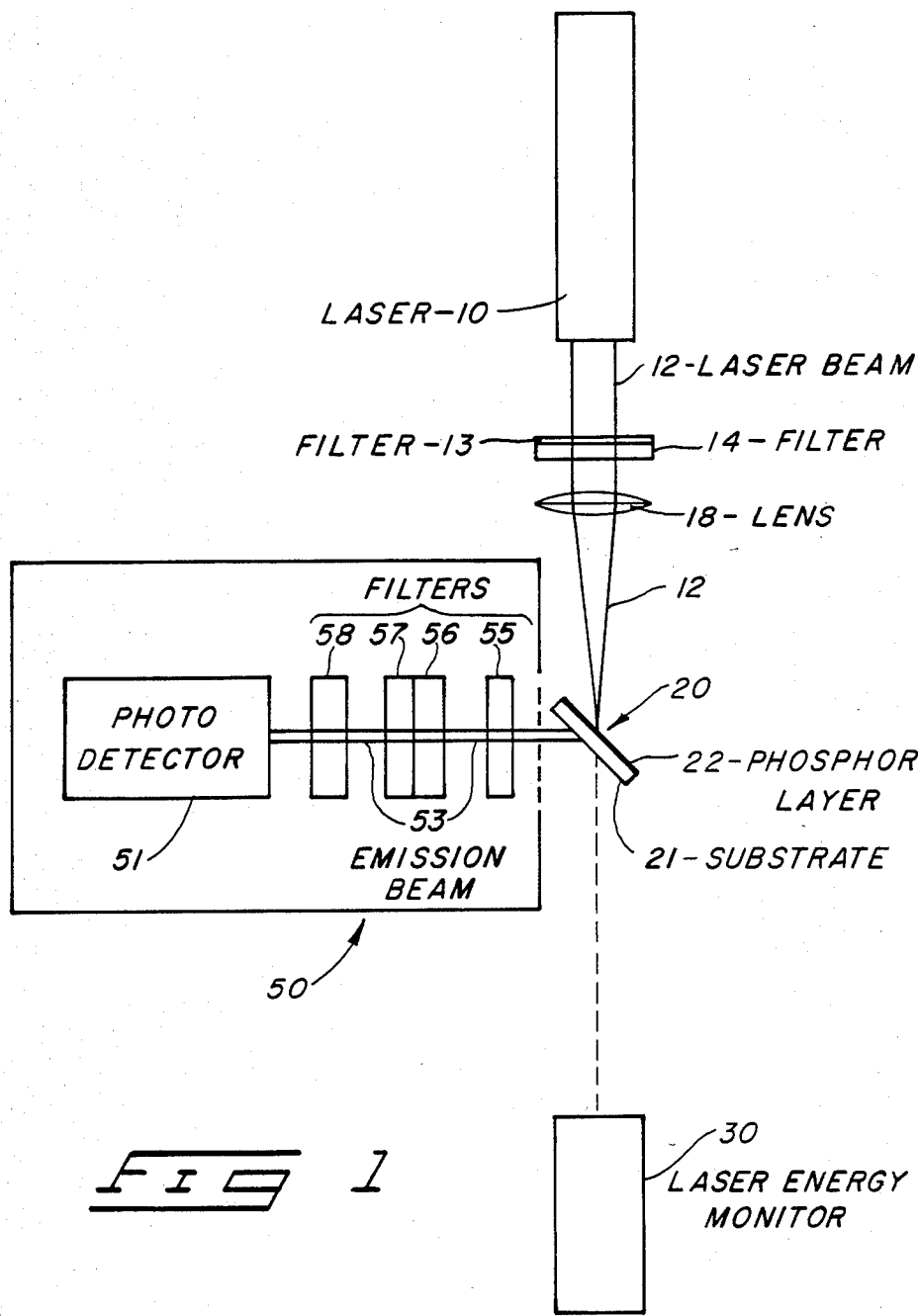
FIG. 1 is a diagrammatic presentation of an apparatus used to rapidly stimulate luminescent materials according to this invention.

In compliance with the constitutional purpose of the Patent Laws "to promote the progress of science and useful arts" (Article 1, Section 8), applicant submits the following disclosure of the invention.

The invention includes a method for rapidly and optically stimulating luminescent phosphors to very rapidly release energy stored in the phosphors. The invention also includes a method for rapidly determining the amount of radiation which has impinged upon a unit of luminescent phosphor.

Both methods involve directing an intense beam of photons from a laser at the phosphor. The beam must provide a high photon flux density which brings about optical stimulation, as compared to thermal stimulation. Such optical stimulation can occur in very short periods of time, for example, less than one microsecond.

The method first requires that an appropriate luminescent material or phosphor be used. For this purpose, calcium, strontium, magnesium and barium sulfides doped with europium and samarium have been found acceptable. Barium sulfide doped with cerium and samarium as well as barium fluoro-chloride have also been found acceptable. Many other known or future phosphors may also be acceptable for use with this method but have not yet been positively identified.

Preparation of the phosphors named above is accomplished in the cases of calcium and strontium sulfides by reducing $CaSO_4$ and $SrSO_4$ to their respective sulfides at 900° C. in a $CS_2$ saturated helium atmosphere. Doping is achieved by subsequently heating, in helium for one hour at 950° C. the following pulverized mixtures:

(1) 20 grams (g) $SrS + 1.2$ g $CaF_2 + 1.2$ g $SrSo_4 + 8$ mg $Eu_2O_3 + 19$ mg $Sm_2O_3$; or (2) 20 g $CaS + 1.2$ g $CaF_2 + 8$ mg $Eu_2O_3 + 12$ mg $Sm_2O_3$.

The appropriate luminescent phosphor is preferably deposited upon a glass or other translucent substrate material so that it can be easily handled.

The luminescent phosphors can then be exposed to a dose of ionizing radiation such as gamma, X or ultraviolet radiation. Exposure to the ionizing radiation causes a transformation within the luminescent phosphor which is believed to involve migration of an electron from one ion to a different ion resulting in a higher energy level for the migrated electron. This transformation or migration between differing ions is represented in FIG. 3.

FIG. 3 shows a first electron state I having an associated energy level $E_1$. State I represents the condition or state of the electron when it is still a part of the first ion. The electron is energized by ionizing radiation which must be sufficiently energetic to cause it to rise to at least energy level $E_2$. Energy level $E_2$ represents the energy level necessary for the electron to undergo the transformation or migration to the second ion. Electron state II represents this transformation step. State III represents the electron after it completes the transformation and becomes part of the second ion. State III has an associated energy level $E_3$ which is less than $E_2$ but greater than $E_1$; thereby providing the desired energy storage with sufficient stability to survive until the phosphor is later stimulated. This stored energy is herein referred to as luminescent energy.

The nature of the luminescent phosphor allows luminescent energy represented by the difference $E_3-E_1$ to be stored and subsequently emitted in individual quantums. In practice it has been found that the amount of stored luminescent energy is approximately proportional to the amount of ionizing radiation to which the phosphor was exposed.

Once the phosphor has been exposed to ionizing radiation, it is then necessary to stimulate the phosphor to remove it from the relatively stable $E_3$ energy level bringing it back to the $E_2$ energy level from whence it can emit the stored energy by returning to the $E_1$ energy level.

Rapid stimulation of the phosphor can be accomplished by striking the phosphor with an intense beam of light or invisible infrared or other wavelength photons from a laser. The laser source must have a wavelength which is commensurate with the stimulation wavelength for the particular phosphor being excited. The intensity of the beam must also be sufficient to provide a large scale reverse transformation and subsequent emission of the stored luminescent energy in a very short period of time.

The neodymium yttrium aluminum garnet (YAG) laser has been found to be an acceptable laser beam source. Other types of lasers may also be acceptable such as the dye laser which can produce an adjustable wavelength photon beam.

The intensity of the laser beam needed will depend upon the particular phosphor, the thickness of the phosphor layer and the particular application involved. Generally it has been found that a photon flux density of at least $5 \times 10^{19}$ photons per second and per square millimeter are needed to bring about large scale reverse transformation or detrapping of the phosphor. Preferably, the photon flux should be in the range from $5 \times 10^{19}$ to $10^{21}$ photons per second and per square millimeter for the phosphors described above. Greater photon fluxes can be used but are not necessary with the phosphors currently used. Similarly, phosphors not yet experimented with may require greater or lesser photon flux densities for rapid stimulation. This invention clearly contemplates such a broad range of photon flux densities which may be operable to bring about rapid stimulation of the luminescent phosphor.

Having generally described the method for rapidly stimulating luminescent phosphors, refer to FIG. 1 wherein there is shown an apparatus for carrying out the method described above. The apparatus includes a laser 10 which emits a laser beam 12 at a wavelength which is suitable for stimulating the luminescent phosphor which is being employed. An infrared transmissive interference filter 13 is positioned adjacent to the laser to prevent emission of residual light from the laser flash lamp. A neutral density filter 14 is preferably interposed between laser 10 and a focusing lens 18. Lens 18 focuses laser beam 12 to a small diameter point at the surface of phosphor assembly 20. Phosphor assembly 20 comprises a transparent substrate 21 such as a piece of glass, and a layer of luminescent phosphor 22. The layer of luminescent material 22 is preferably approximately 50 to 100 micrometers thick.

Laser beam 12 shines through phosphor assembly 20 and is detected by a laser energy meter or fast photo diode 30 which allows closer monitoring of the laser beam.

The luminescent emission from the luminescent phosphor 22 can be detected by any available means for detecting emissions at the wavelength at which the phosphor emits luminescent energy. The detector shown in FIG. 1 is generally referred to by the reference numeral 50. Detection means 50 includes a photo multiplier 51 which measures the amount of light or other electromagnetic emission which originates from phosphor layer 22 and travels as emission beam 53. Emission detector 50 preferably is provided with an infrared filter 55 to reduce the effect of any reflected or scattered beams from laser 10. Emission detector 50 also can include additional filters 56 and 57 to reduce the strength of emission beam 53 to within measurable levels. A specialized reflector 58 can also be positioned in front of photo multiplier 51 in order to reflect any electromagnetic emission having a wavelength the same or very near the wavelength of laser beam 12, further reducing the effect of any scattered or refracted light originating from the laser beam itself rather than from the luminescent emission.

It will be apparent that the wavelength of laser beam 12 and the wavelength of emission beam 53 should preferably be substantially different in order to allow accurate detection of the phosphor emission. The stimulation wavelength of most luminescent phosphors is different from the emission wavelength thereby allowing the apparatus in FIG. 1 to easily discriminate between the beam produced by laser 10 and an emission produced by phosphor 22.

EXAMPLE

An apparatus was set up as shown diagrammatically in FIG. 1. Laser 10 was a pulsed neodymium yttrium aluminum garnet (YAG) laser. Laser 10 produced a laser beam 12 which had a wavelength equal to approximately 1,064 micrometers. This corresponds to an electromagnetic emission in the infrared range of the spectrum. Laser 10 was operated either in a free running mode emitting irregular and spiky pulses of 300 milliseconds total length and containing up to several millijoules of energy. Laser 10 alternatively was Q-switched resulting in a pulse having a 14 nanosecond full width at half maximum intensity with 0.3 millijoules of energy. An infrared transmissive interference filter 13 prevented the emission of residual light from the flash lamp of laser 10. A series of neutral density filters 14 attenuated laser beam 12 by a factor of up to $10^3$. Lens 18 focused the normally 50 micrometer diameter laser beam spot down to about 2 micrometer in diameter at the surface of the luminescent assembly 20.

The luminescent assembly 20 included a transparent substrate made from a 22 millimeter square glass microscope slide cover having a thickness of 100 micrometers. The luminescent phosphor layer 22 was settled onto the substrate 21 from a powder suspension formed as described above to produce an approximately 50 micrometer thick phosphor layer 22. The phosphor assembly 20 was oriented at a 45° angle with respect to laser beam 12 thereby enabling emission beam 53 to more easily pass through substrate 21 along a shorter path than if the substrate 21 where oriented more perpendicularly to laser beam 12.

The phosphor layer 22 was alternatively made from calcium and strontium sulfides doped with europium and samarium produced as described above. These phosphors have luminescent emission spectra which are centered at approximately 630 and 590 nanometers, respectively. They also have stimulation wavelength spectra which are centered at 1.18 and 1.02 micrometers, respectively. Accordingly it was possible to stimulate both phosphors using the 1.064 micrometer laser beam 12 to produce luminescent emissions which were at significantly shorter wavelengths.

The laser beam intensity was monitored using a laser energy meter or fast photo diode 30.

The differences between the wavelengths of the stimulation and luminescent emission spectra, allowed the photomultiplier 51 to be supplied with three 5 millimeter thick glass filters 55, 56 and 57 between the photomultiplier and the luminescent phosphor layer 22 to help filter out laser beam efflux which was scattered by equipment and floating particles. A dichroic reflector 58 was also sometimes used to reflect 1.06 micrometer photons. Reflector 58 was transparent to the visible light emissions produced by the phosphors.

The photomultiplier signal was connected to an oscilloscope (not pictured) using a 50 ohm load resistor to provide an overall time resolution of about 3 nanoseconds. In another configuration a larger ohmic load resistor was used to integrate the signal for measurement of the luminescent emission since the photomultiplier 51 has a less than linear output as a function of the total emission from phosphor layer 22.

FIG. 2 shows representative curves indicating the intensity of emissions vs. time. The curve labeled 31 is the Q-switched laser beam pulse produced by laser 10. Curve 32 is the emission from calcium sulfide doped with europium and samarium and curve 33 is the emission from strontium sulfide doped with europium and samarium. The curves have been shifted so as to bring the peaks into coincidence at one pont in time. Curves 32 and 33 were shifted by approximately 4 nanoseconds which represents the time delay in luminescent emission output with respect to the stimulating laser beam 12.

The laser beam striking the phosphors was focused by lens 18 to produce an increased photon flux density. The experimental results indicate that photon flux densities greater than $5.4 \times 10^{19}$ photons per second and square millimeter are necessary to bring about complete electron detrapping of the phosphors used in this experiment. Photon flux densities of about $10^{21}$ photons per second and per square millimeter are believed adequate to provide complete detrapping under a variety of circumstances. It will be apparent to those skilled in the art that other luminescent phosphors may have varying photon flux requirements. Increased or decreased levels of photon flux would then be necessary or advisable to appropriately bring about complete detrapping for such phosphors.

Comparison of total emissions from these luminescent phosphors and control phosphors exposed to the identical doses of ultraviolet or X radiation showed that reliable measurements of the amount of ionizing radiation could be determined from the total emission resulting from high photon flux laser stimulation. Photon laser pulses as short as 14 nonoseconds duration were effective in bringing about transformation of the stored luminescent energy into a luminescent emission. These very rapid stimulation times must be compared with the prior art thermal stimulation techniques which, as exemplified by Yamashita (U.S. Pat. No. 3,729,630), required stimulation times on the order of $\frac{1}{2}$ second or $5 \times 10^8$ nanoseconds. Thus, it is clear that this invention brings about a great reduction in the time required to stimulate phosphors and to recover the information stored therein.

The invention also includes a method for rapidly determining the amount of ionizing radiation which impinged upon a unit of luminescent phosphor. This method first includes rapidly stimulating the exposed luminescent phosphor using the method described above. The stimulated phosphor layer 22 produces a luminescent emission beam 53 which is measured using photo multiplier 51 or some other light or electromagnetic emission intensity detector. The peak level of light or emission intensity is then correlated to experimentally derived standard values which relate emission peak intensity to amount of ionizing radiation striking the phosphor. These standard values are derived experimentally using known levels of ionizing radiation and the particular phosphors being used. The amount of ionizing radiation is then determined from these standard values.

The method for rapidly determining the amount of ionizing radiation can alternatively use the total quantity of luminescent emission as compared to peak intensity level of the emission. The intensity of the luminescent emission beam is measured over time and integrated to give a measurement of the total quantity of luminescent emission. This value can then be compared to experimentally derived standard values for the total quantity of emission rather than intensity peak levels.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents. scope of the appended claims, appropriately interpreted in accordance with the doctrine of equivalents.

We claim:

1. A method for rapidly and optically stimulating luminescent phosphors to cause luminescent energy previously stored in the luminescent phosphors to be rapidly released, comprising:

directing an intense beam of photons from a laser at the luminescent phosphor for a period of time less than one millisecond and with a photon flux density of at least $5 \times 10^{19}$ photons per second and per square millimeter; said beam of photons having a wavelength approximately equal to the stimulation wavelength for the phosphor.

2. The method of claim 1 wherein the beam of photons from the laser is focused prior to striking the luminescent phosphor.

3. The method of claim 1 wherein the beam of photons occurs in a pulse lasting less than 1 microsecond.

4. The method of claim 1 wherein the beam of photons strikes a particular area of the luminescent phosphor for a period of less than 1 microsecond.

5. The method of claim 1 wherein the beam of photons strikes a particular area of the luminescent phosphor for a period of approximately 100 nanoseconds measured according to full width at half the maximum value of the beam intensity.

6. The method of claim 1 wherein the wavelength of the beam of photons is between 0.1 and 10 micrometers.

7. The method of claim 1 wherein the wavelength of the beam of photons is approximately 1.06 micrometers.

8. The method of claim 1 wherein the wavelength of the photon beam is approximately equal to the wavelength of a stimulation spectrum of the luminescent phosphor.

9. The method of claim 1 wherein the luminescent phosphors are from the group including calcium sulfide, strontium sulfide, magnesium sulfide or barium sulfide doped with europium and samarium.

10. The method of claim 1 wherein the luminescent phosphors are from the group including barium sulfide doped with cerium and samarium.

11. The method of claim 1 wherein:
the beam of photons strikes the luminescent phosphor with a flux density of between $5 \times 10^{19}$ and $10^{21}$ photons per second and per square millimeter; and
the beam of photons strikes the luminescent phosphor for a period of less than 1 microsecond.

12. The method of claim 11 wherein the beam of photons has a wavelength in the range between 0.8 and 10 micrometers.

13. The method of claim 11 wherein the laser is a neodymium yttrium aluminum garnet laser producing a beam of photons having a wavelength of approximately 1.06 micrometers.

14. The method of claim 11 wherein the laser is a dye laser having a photon beam output which is adjustable over a range of wavelengths so that a variety of luminescent phosphors can be excited.

15. The method of claim 1 wherein the luminescent phosphor is barium fluoro-chloride.

16. A method for determining the amount of ionizing radiation which has impinged upon a unit of luminescent phosphor, comprising:
striking the unit of luminescent phosphor with a stimulating beam of photons from a laser; said stimulating beam of photons being emitted from the laser at a wavelength approximately equal to a stimulation wavelength of the phosphor for a period of time equal to less than 1 microsecond and at a photon flux density of at least $5 \times 10^{19}$ photons per second and per square millimeter;
measuring the peak intensity of the luminescent emission beam produced by the unit of luminescent phosphor as a result of the previous step;
correlating the measured peak intensity of the luminescent emission with experimentally derived standard values associated with the phosphor being used which relate phosphor emission beam peak intensity to the amount of ionizing radiation to determine the amount of ionizing radiation which impinged upon the unit of luminescent phosphor.

17. A method for determining the amount of ionizing radiation which has impinged upon a unit of luminescent phosphor, comprising:
striking the unit of luminescent phosphor with a stimulating beam of photons from a laser; said stimulating beam of photons being emitted from the laser at a wavelength approximately equal to a stimulation wavelength of the phosphor for a period of time equal to less than 1 microsecond and at a photon flux density of at least $5 \times 10^{19}$ photons per second and per square millimeter;
measuring the intensity of the luminescent emission beam produced by the unit of luminescent phosphor as a result of the previous step and integrating this value over time to produce a measurement of the total quantity of luminescent emission;
comparing said measurement of the total quantity of luminescent emission with experimentally derived standard values associated with the phosphor being used which relate total quantity of luminescent emission to amount of ionizing radiation to determine the amount of ionizing radiation which impinged upon the unit of luminescent phosphor.

* * * * *